(12) United States Patent
Nagasawa

(10) Patent No.: US 11,654,849 B2
(45) Date of Patent: May 23, 2023

(54) AIRBAG APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/690,181

(22) Filed: Mar. 9, 2022

(65) Prior Publication Data

US 2022/0306029 A1 Sep. 29, 2022

(30) Foreign Application Priority Data

Mar. 29, 2021 (JP) .............................. JP2021-054741

(51) Int. Cl.
*B60R 21/0134* (2006.01)
*B60R 21/36* (2011.01)

(52) U.S. Cl.
CPC .......... *B60R 21/0134* (2013.01); *B60R 21/36* (2013.01)

(58) Field of Classification Search
CPC ............................ B60R 21/0134; B60R 21/36
See application file for complete search history.

(56) References Cited

U.S. PATENT DOCUMENTS

| | | | |
|---|---|---|---|
| 7,073,619 B2 * | 7/2006 | Alexander | B60R 21/36 180/274 |
| 8,408,350 B2 * | 4/2013 | Wilmot | B60R 21/36 180/274 |
| 10,471,927 B1 * | 11/2019 | Gupta | B60R 21/36 |
| 10,953,844 B2 * | 3/2021 | Farooq | B60R 21/36 |
| 2001/0028173 A1 | 10/2001 | Demarquilly et al. | |

FOREIGN PATENT DOCUMENTS

| | | |
|---|---|---|
| JP | 2001-301550 A | 10/2001 |
| JP | 2008-044594 A | 2/2008 |

* cited by examiner

*Primary Examiner* — Faye M Fleming
(74) *Attorney, Agent, or Firm* — McGinn I.P. Law Group, PLLC.

(57) ABSTRACT

An airbag apparatus to be applied to a vehicle includes an airbag, a collision determiner, and an airbag deployment controller. The airbag is configured to be deployed forward of a vehicle body front of the vehicle. The collision determiner is configured to establish a human-body pre-crash determination in a case where a collision probability with a human body is equal to or higher than a predetermined threshold. The airbag deployment controller is configured to deploy the airbag in response to the human-body pre-crash determination. The airbag includes a pulling member configured to pull and recess a front surface of the airbag rearward of the vehicle so as to form a slit portion configured to divide a front portion of the airbag.

13 Claims, 7 Drawing Sheets

AIRBAG APPARATUS

CROSS-REFERENCE TO RELATED APPLICATIONS

The present application claims priority from Japanese Patent Application No. 2021-054741 filed on Mar. 29, 2021, the entire contents of which are hereby incorporated by reference.

BACKGROUND

The disclosure relates to an airbag apparatus including an airbag deployable outward from a vehicle body front of a vehicle such as an automobile.

Concerning a vehicle such as an automobile, it has been proposed to use an airbag deployable out of the vehicle so as to prevent damage to a vehicle body, for example, during a collision.

As a technique regarding such an external airbag apparatus, Japanese Unexamined Patent Application Publication (JP-A) No. 2001-301550, for example, discloses that an expandable element (airbag) is deployed forward of a vehicle body of a railroad vehicle, and that a surface in contact with a region of the vehicle that is to be protected and a surface that receives an impact are coupled with a plurality of flexible coupling elements.

As a technique regarding control of a shape and other properties of an airbag during deployment, JP-A No. 2008-044594, for example, discloses an airbag disposed inside a vehicle cabin of a vehicle so as to protect an occupant during a collision. The airbag includes a plurality of tethers to restrict a separation distance from a storage portion to an occupant protecting portion of the airbag when expanded completely, and engagement members to engage the tethers with the storage portion. The engagement members release engagement with the tethers selectively to incline the occupant protecting portion.

SUMMARY

An aspect of the disclosure provides an airbag apparatus to be applied to a vehicle. The airbag apparatus includes an airbag, a collision determiner, and an airbag deployment controller. The airbag is configured to be deployed forward of a vehicle body front of the vehicle. The collision determiner is configured to establish a human-body pre-crash determination in a case where a first collision probability with a human body is equal to or higher than a predetermined threshold. The airbag deployment controller is configured to deploy the airbag in response to the human-body pre-crash determination. The airbag includes a pulling member configured to pull and recess a front surface of the airbag rearward of the vehicle so as to form a slit portion configured to divide a front portion of the airbag.

An aspect of the disclosure provides an airbag apparatus to be applied to a vehicle. The airbag apparatus includes an airbag and circuitry. The airbag is configured to be deployed forward of a vehicle body front of the vehicle. The circuitry is configured to establish a human-body pre-crash determination in a case where a first collision probability with a human body is equal to or higher than a predetermined threshold. The circuitry is configured to deploy the airbag in response to the human-body pre-crash determination. The airbag includes a pulling member configured to pull and recess a front surface of the airbag rearward of the vehicle so as to form a slit portion configured to divide a front portion of the airbag.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Concerning a collision of a vehicle with a pedestrian or a bicyclist (hereinafter referred to as a "pedestrian or the like"), there has been a demand for preventing injury to the pedestrian or the like.

It is desirable to provide an airbag apparatus that can prevent injury to a pedestrian or the like.

In general, a vehicle such as an automobile is designed considering absorption of collision energy by collapsing a front structure of a vehicle body upon a frontal collision.

In many cases, such energy absorption is on the assumption that another vehicle that has collided with the host vehicle has substantially the same vehicle weight as the host vehicle, and that the collision occurs at a relative speed of several tens of km per hour, for example.

Actually, however, there is a possibility of occurrence of a collision with a vehicle larger than the host vehicle, a collision with a vehicle at a higher speed than a presumed vehicle speed, and a multiple collision with a plurality of vehicles in succession, for example. Presumably, there are also cases where sufficient energy absorption is not performed by collapsing the vehicle body structure.

Consequently, there has been a demand for mitigating damage during a collision without excessively depending on the vehicle body structure.

It is also desirable to provide an airbag apparatus that makes it possible to mitigate damage to a vehicle during a collision with an object.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Hereinafter, a description will be made on an airbag apparatus according to a first embodiment of the disclosure.

The airbag apparatus according to the first embodiment is disposed, for example, on a front of a vehicle body of an automobile such as a passenger vehicle so as to protect (reduce injuriousness to) a human body of a pedestrian, a bicyclist or the like with whom the automobile has collided, and also to mitigate damage to the vehicle body of the host vehicle, for example, during a collision with an object such as another vehicle.

Figure 1:
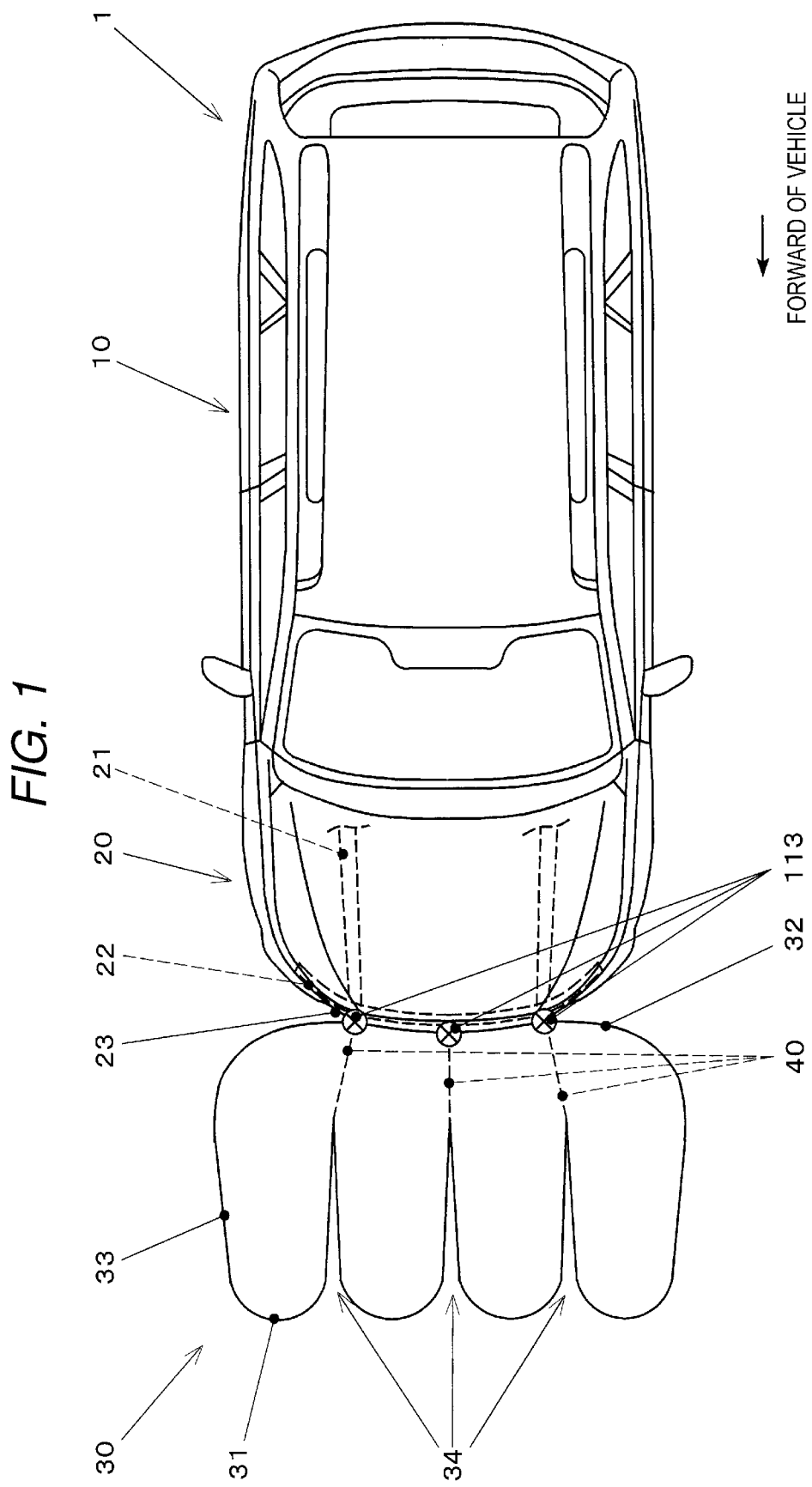
FIG. 1 is a diagram schematically illustrating a configuration of an airbag apparatus according to an embodiment of the disclosure.

FIG. 1 is a diagram schematically illustrating a configuration of the airbag apparatus according to the first embodiment.

FIG. 1 illustrates a state of a vehicle including the airbag apparatus according to the first embodiment, as viewed from above.

The vehicle 1 has, for example, a so-called two-box vehicle shape including an engine compartment 20 that protrudes forward from a vehicle cabin 10.

The vehicle cabin 10 has a space containing an occupant, for example.

The engine compartment 20 has a space containing power train components such as an engine, a transmission, a motor-generator in the case of an electric vehicle, and control units for these components.

The engine compartment 20 includes front side frames 21, a bumper beam 22, a front bumper 23, and other components.

The front side frames 21 are structural members protruding toward the front of the vehicle from a toeboard, not illustrated, which is a partition wall disposed on a front end of the vehicle cabin 10.

The front side frames 21 serve, for example, as cross members where a power train and a front suspension are attached, and as a base portion where a component such as a strut housing containing struts of a MacPherson-strut front suspension is attached.

For example, a steel plate is molded into components by presswork, and the components are gathered and welded into the front side frames 21. Thus, the front side frames 21 each have a closed rectangular cross-sectional shape as viewed from a vehicle fore-and-aft direction.

The bumper beam 22 is a structural member disposed on the vehicle body front and extending in a vehicle width direction.

For example, a steel plate is molded into components by presswork, and the components are gathered and welded into the bumper beam 22 or the bumper beam 22 is made of an extruded material of aluminum alloy. Thus, the bumper beam 22 is a beam-shape member of a closed cross-sectional shape.

An intermediate portion of the bumper beam 22 is coupled to front ends of the left and right front side frames 21.

Both ends of the bumper beam 22 in the vehicle width direction protrude outward in the vehicle width direction from the front side frames 21.

The bumper beam 22 is a load transmission member by which a load that an airbag 30, described later, receives from a human body or object collided with is transmitted to a rear side of the vehicle body via the front side frames 21.

The front bumper 23 is an exterior member disposed on a front end of the vehicle body, and includes a bumper face that is made of a material such as PP resin and that constitutes a skin. The bumper face is attached to the vehicle body with brackets, not illustrated, for example.

A front surface of the front bumper 23 is curved in such a manner that the vehicle front is convex when the vehicle 1 is viewed from above.

The bumper beam 22 has such an arcuate shape that the vehicle front is convex along a curve of the front surface of the front bumper 23 when the vehicle 1 is viewed from above.

The airbag apparatus according to the first embodiment includes the airbag 30.

The airbag 30 is formed in a bag shape by bonding panels of base cloth such as nylon 66 woven fabric.

When each pre-crash determination, described later, is established, deployment gas generated by an inflator 111 is introduced into the airbag 30, and the airbag 30 is deployed and further expanded.

The airbag 30 is deployed forward of the vehicle from a center portion of the front end of the vehicle body in the vehicle width direction.

The airbag 30 includes a front surface 31, a rear surface 32, and side surfaces 33, for example.

The front surface 31 is a surface portion that constitutes a front end of the airbag 30. Upon a collision, a pedestrian, another vehicle or the like first comes into contact with the front surface 31.

The rear surface 32 is a surface portion that constitutes a rear end of the airbag 30. The rear surface 32 extends along the front surface of the front bumper 23.

The side surfaces 33 extend between left and right side ends of the front surface 31 and between left and right side ends of the rear surface 32 in the fore-and-aft direction.

An upper surface, not illustrated, extends between an upper end of the front surface 31 and an upper end of the rear surface 32. A lower surface, not illustrated, extends between a lower end of the front surface 31 and a lower end of the rear surface 32.

In normal operation (before a pre-crash determination is established), the airbag 30 in a folded state is attached to the bumper beam 22 and contained inside the front bumper 23.

Upon a collision, the airbag 30 ruptures a fragile portion of the front bumper 23 and is unfolded forward of the vehicle and deployed forward of the front surface of the front bumper 23.

Tethers 40 are disposed inside the airbag 30.

The tethers 40 are flexible, belt-shaped members made of, for example, base cloth panels in a strap shape. In one example, the tethers 40 may serve as "pulling members".

The tethers 40 couple the front surface 31 and the rear surface 32 of the airbag 30 to each other and pull the front surface 31 rearward of the vehicle upon deployment of the airbag 30 so as to serve to form slit portions 34.

In the embodiment, the three tethers 40, for example, extend radially in a plan view.

Front ends of the tethers 40 are coupled to an inner surface of the front surface 31.

The front ends of the tethers 40 are distributed in the vehicle width direction.

Rear ends of the tethers 40 are coupled to an inner surface of the rear surface 32.

The rear ends of the tethers 40 are distributed in the vehicle width direction.

On each of the rear ends of the tethers 40, a tether cutter 113 is provided to cut the tether 40 in response to a command from an airbag control unit 110.

FIG. 1 illustrates the tethers 40 in an uncut state (where the tethers 40 are enabled).

With the above-described configuration, when the tethers 40 are in an enabled (uncut) state, the slit portions 34 recessed rearward of the vehicle are formed in the front surface 31 at three positions distributed in the vehicle width direction.

Each of the slit portions 34 has, for example, a groove shape extending substantially vertically.

The front portion of the airbag 30 where the slit portions 34 are formed in the vehicle fore-and-aft direction is divided into a plurality of regions disposed in the vehicle width direction.

As illustrated in FIG. 1 and other drawings, the front surface 31 of the airbag 30 except for the regions where the slit portions 34 are formed has convexly curved surfaces protruding forward.

When a pedestrian or the like collides with the front surface 31, each of these convexly curved surfaces serves to guide the pedestrian or the like to the slit portion 34 on one of the left and right sides of the convexly curved surface.

Figure 2:
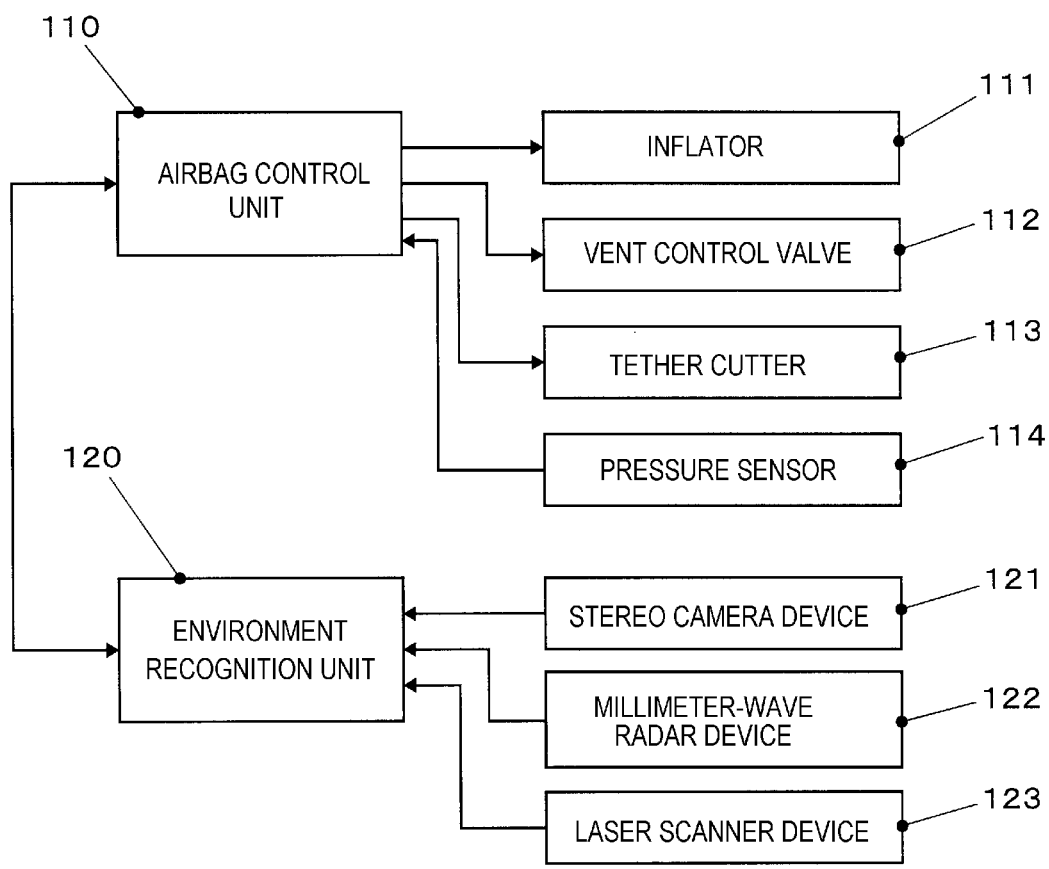
FIG. 2 is a block diagram schematically illustrating a configuration of a system to control the airbag apparatus according to the embodiment.

FIG. 2 is a block diagram schematically illustrating a configuration of a system to control the airbag apparatus according to the first embodiment.

The system to control the airbag apparatus includes components such as the airbag control unit 110, and an environment recognition unit 120.

Each of these units may be provided as, for example, a microcomputer including an information processor such as a CPU, storages such as a RAM and a ROM, an input/output interface, and buses to couple these components to one another.

The units are connected via in-vehicle LAN such as a CAN communication system or directly and are mutually communicable.

The airbag control unit 110 commands and controls the inflator 111, a vent control valve 112, and the tether cutters 113 so as to deploy the airbag 30 and also to control a deployment state.

In one example, the airbag control unit 110 may serve as an "airbag deployment controller".

The inflator 111 is a chemical (explosive) gas generation device to generate deployment gas to deploy the airbag 30 in response to a command from the airbag control unit 110.

The vent control valve 112 opens and closes a vent passage, not illustrated, to discharge gas from the airbag 30 (e.g., release gas to the atmosphere).

The vent control valve 112 serves, for example, to independently open and close the vent passage of the airbag 30 in response to a command from the airbag control unit 110.

The vent control valve 112 may include an electromagnetic valve, for example.

The tether cutters 113 are disposed on the rear ends of the tethers 40 and cut the tethers 40 in response to a command from the airbag control unit 110. In one example, the tether cutters 113 may serve as a "pulling member disabling unit".

The tether cutters 113 may cause chemical (explosive) actuators, for example, to cut the tethers 40.

The airbag control unit 110 is provided with a pressure sensor 114.

The pressure sensor 114 serves to detect an internal pressure of the airbag 30.

Based on an output from the pressure sensor 114, the airbag control unit 110 can detect an input state of the load on the airbag 30.

The environment recognition unit 120 recognizes an environment around the host vehicle based on outputs from various sensors.

The environment recognition unit 120 serves to recognize, for example, human bodies of pedestrians, bicyclists, or the like, various objects such as other vehicles, buildings, trees, and geographical features, and road shapes (lane shapes) in the vicinity of the vehicle 1 (host vehicle).

When a collision with a human body of a pedestrian, a bicyclist, a motorcyclist, or the like, or with an object other than a human body, such as another vehicle, is unavoidable (when a collision probability is a predetermined value or higher), the environment recognition unit 120 establishes a pre-crash determination. In one example, the environment recognition unit 120 may serve as a "collision determiner".

Components such as a stereo camera device 121, a millimeter-wave radar device 122, and a laser scanner device 123 are coupled to the environment recognition unit 120.

The stereo camera device 121 includes a pair of cameras disposed at a predetermined interval (base line length), and serves to recognize human bodies of pedestrians, bicyclists, or the like, and objects such as other vehicles and buildings. The stereo camera device 121 also serves to detect a position of each of the human bodies, objects, or the like relative to the vehicle 1 using known stereo image processing.

The stereo camera device 121 serves to recognize attributes of a subject or object by, for example, pattern recognition of a captured image.

For example, in the case of a human body of a pedestrian or the like, the stereo camera device 121 serves to recognize attributes such as a build, presumed weight, and posture of the human body.

For example, in the case of an object such as another vehicle, the stereo camera device 121 serves to recognize a model and size of the other vehicle (e.g., whether the other vehicle is a large-size vehicle, such as a truck, bus, and large-size SUV, which has a notably larger weight than the vehicle 1).

The millimeter-wave radar device 122 uses radio waves in a frequency band of 30 to 300 GHz, for example, and serves to detect presence of a human body, an object, or the like, and positions of the human body, the object, or the like relative to the vehicle 1.

The laser scanner device (LiDAR) 123 irradiates and scans the vehicle 1 and its vicinity with a near-infrared laser beam in a pulse shape, for example. Based on presence of reflected light and time lags until the reflected light returns, the laser scanner device 123 serves to detect presence of a human body, an object, or the like, positions of the human body, the object, or the like relative to the vehicle 1, and shapes of the human body, the object, or the like.

When a collision with a human body of a pedestrian or the like, or an object such as another vehicle is unavoidable (when a pre-crash determination is established), for example, the environment recognition unit 120 is capable of recognizing a collision mode with the human body, the object, or the like (e.g., a speed vector of the other party of the collision with respect to the vehicle 1, and a collision position relative to the vehicle 1), and attributes of the other party of the collision (e.g., a build of the human body and a model of the other vehicle).

Next, an operation of the airbag apparatus according to the first embodiment will be described.

Figure 3:
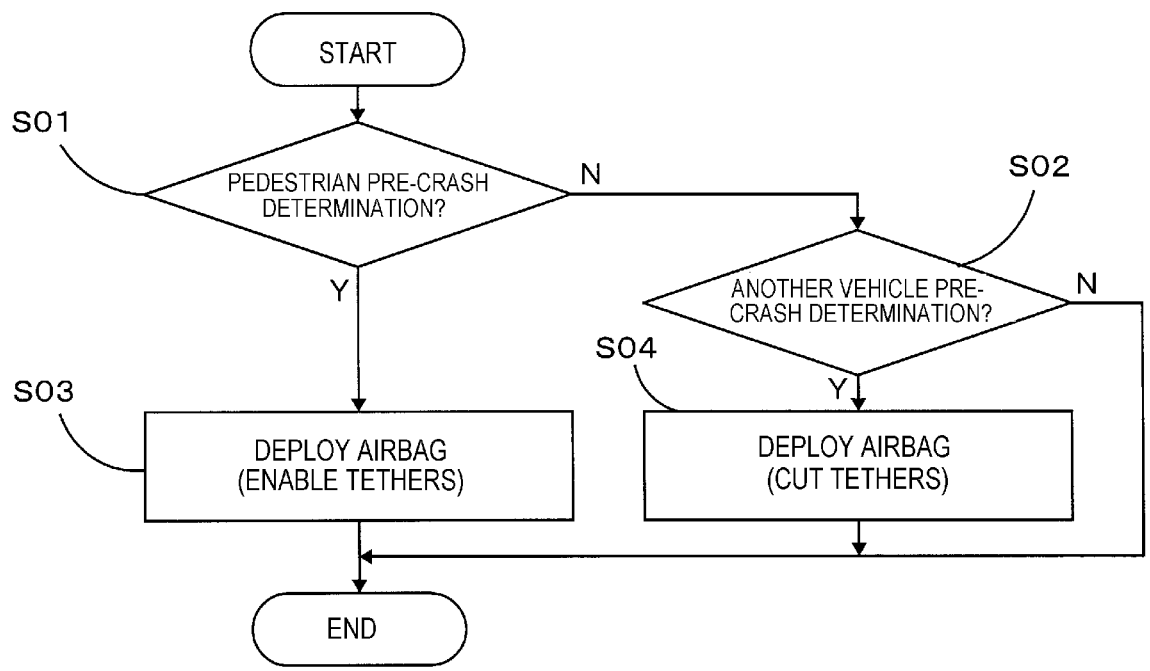
FIG. 3 is a flowchart of an operation of the airbag apparatus according to the embodiment in the event of a collision.

FIG. 3 is a flowchart of an operation of the airbag apparatus according to the first embodiment in the event of a collision.

The operation will now be described step by step.

Step S01: Pedestrian Pre-Crash Determination

Using known pre-crash determination logic, the environment recognition unit 120 estimates a probability of occurrence of a collision with a human body of a pedestrian, a bicyclist, or the like approaching from ahead of the vehicle 1, and determines whether the estimated probability is equal to or higher than a preset threshold.

When the probability of occurrence of the collision is equal to or higher than the threshold, the environment recognition unit 120 regards the collision as unavoidable, establishes a human-body pre-crash determination, and the process proceeds to step S03. Otherwise, the process proceeds to step S02.

Step S02: Another Vehicle Pre-Crash Determination

Using known pre-crash determination logic, the environment recognition unit 120 estimates a probability of occurrence of a collision with an object other than a human body, such as another vehicle approaching from ahead of the vehicle 1 and a building, and determines whether the estimated probability is equal to or higher than a preset threshold.

When the probability of occurrence of the collision is equal to or higher than the threshold, the environment recognition unit 120 regards the collision as unavoidable, establishes an object pre-crash determination, and the process proceeds to step S04. Otherwise, the process ends (returns).

Step S03: Airbag Deployment (Tethers Enabled)

The airbag control unit 110 gives the inflator 111 a command to generate deployment gas so as to deploy the airbag 30.

At this time, the tether cutters 113 are not operated, and the tethers 40 are kept enabled while coupling the front surface 31 and the rear surface 32 of the airbag 30 to each other and pulling the front surface 31 rearward.

Thus, the front portion of the airbag 30 is divided by the plurality of slit portions 34.

Until the deployment of the airbag 30 is completed, for example, the vent control valve 112 may be in a closed state to quicken the deployment, and the vent control valve 112 may be switched to an opened state after the deployment is ended.

Thus, an internal pressure of the airbag 30, a volume of which is restricted by the tethers 40, can be prevented from excessively increasing, and the airbag 30 can be contracted while air is being discharged from the airbag 30 in accordance with a progress of the collision with the pedestrian or the like so as to absorb energy.

Thereafter, the pedestrian or the like is pressed forward and accelerated by the airbag 30, and after a relative speed of the pedestrian or the like and the vehicle body is decreased to a predetermined threshold or lower, the vent control valve 112 is switched to a closed state so that the internal pressure of the airbag 30 can be increased to reinforce restraint of the pedestrian or the like. This threshold for the relative speed is set considering, for example, prevention of the pedestrian or the like from being seriously disabled during the collision with the vehicle body.

Then, the process ends.

Step S04: Airbag Deployment (Tethers Cut)

The airbag control unit 110 gives the inflator 111 a command to generate deployment gas so as to deploy the airbag 30.

At this time, the airbag control unit 110 gives the tether cutters 113 a command to cut ends of the tethers 40 on the rear surface 32 side and disable the tethers 40.

Until the deployment of the airbag 30 is completed, for example, the vent control valve 112 may be in a closed state to quicken the deployment, and the vent control valve 112 may be switched to an opened state after the deployment is ended.

Thus, the airbag 30 can be contracted while air is being discharged from the airbag 30 in accordance with a progress of the collision with the other vehicle or the like so as to absorb energy.

Then, the process ends.

A description will now be made on states, functions, and effects of the airbag apparatus according to the first embodiment during a collision with a pedestrian and a collision with another vehicle.

Figure 4:
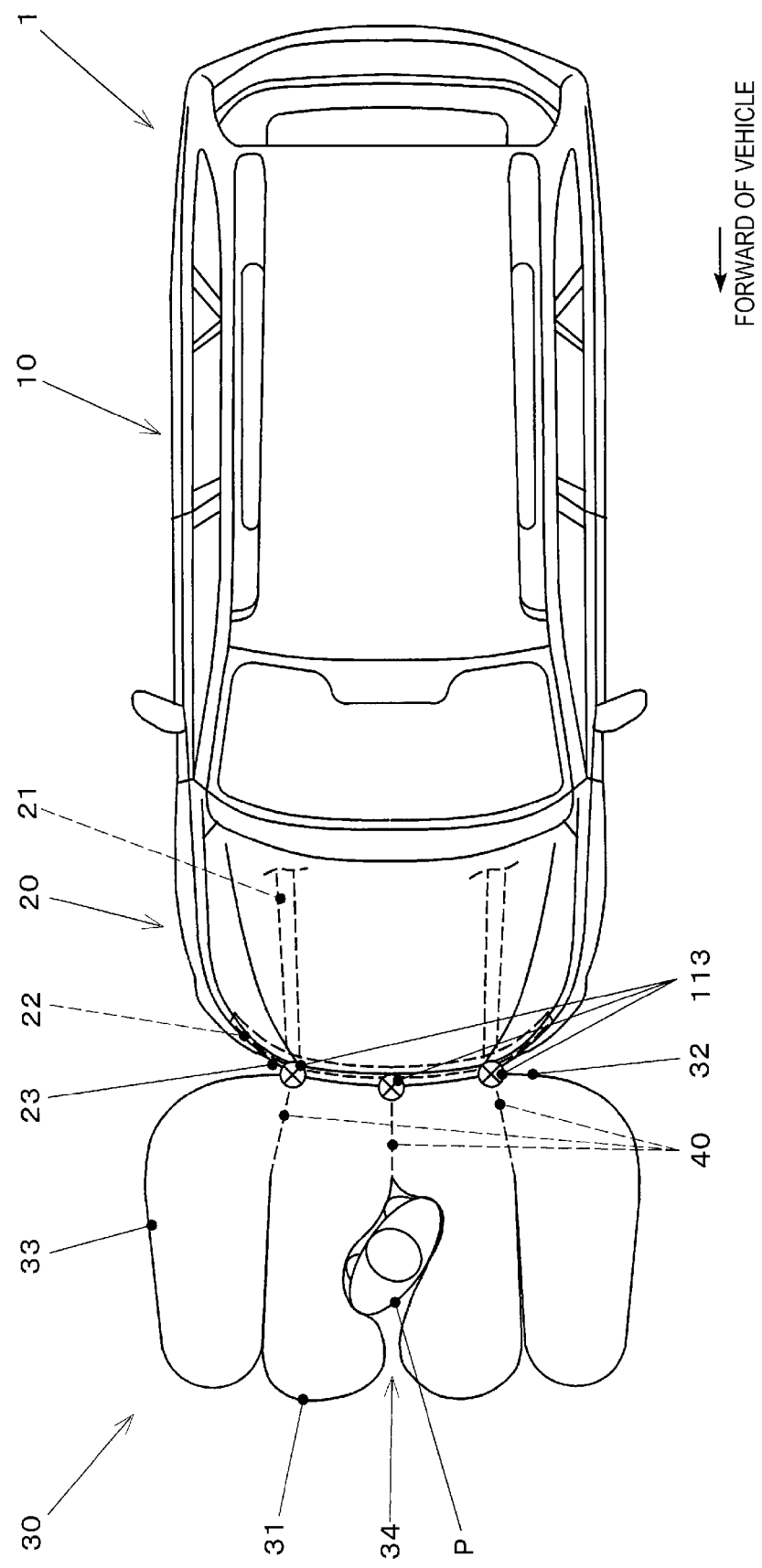
FIG. 4 is a diagram schematically illustrating a state after a vehicle including the airbag apparatus according to the embodiment has collided with a pedestrian.

FIG. 4 is a diagram schematically illustrating a state after a vehicle including the airbag apparatus according to the first embodiment has collided with a pedestrian.

When a pre-crash determination is established and when a collision with a pedestrian P is predicted, the airbag 30 is deployed with the tethers 40 in an enabled (uncut) state.

In this case, as illustrated in FIG. 4, the tethers 40 pull the front surface 31 rearward to form the plurality of slit portions 34.

In an example illustrated in FIG. 4, the pedestrian P enters and is restrained in a central one of the slit portions 34 in the vehicle width direction.

In this state, the airbag 30 is contracted while gas is discharged from the vent passage so as to absorb collision energy, and also, the airbag 30 presses and accelerates the pedestrian P forward of the vehicle so as to decrease the relative speed of the vehicle body and the pedestrian P.

When the relative speed becomes equal to or less than a predetermined threshold, the airbag control unit 110 switches the vent control valve 112 to a closed state to increase the internal pressure of the airbag 30.

Thus, retention force to hold the pedestrian P inside the slit portion 34 is increased to prevent secondary injury such as the pedestrian P being thrown forward of the airbag 30 in accordance with deceleration of the vehicle 1.

Figure 5:
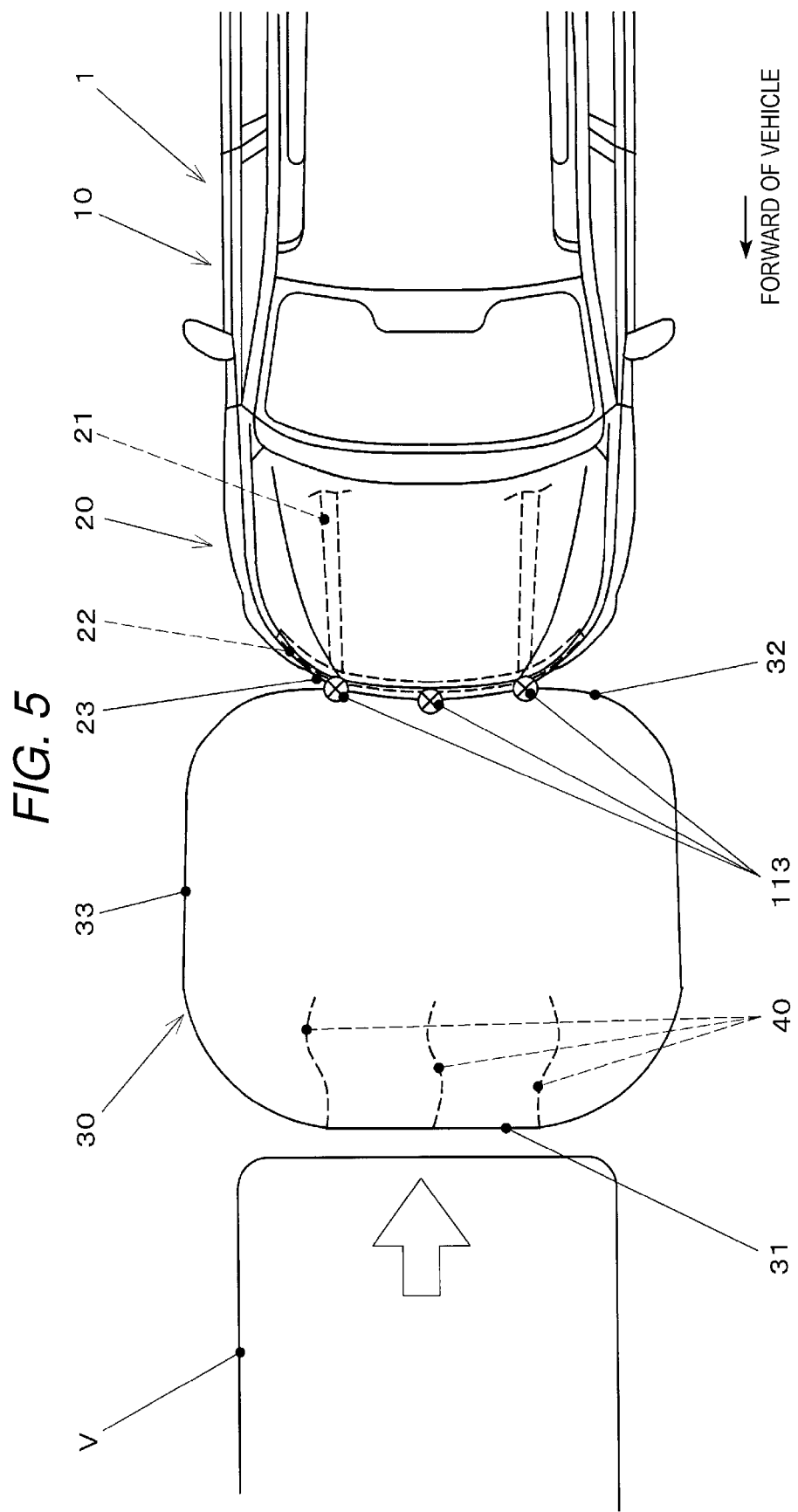
FIG. 5 is a diagram schematically illustrating a state after the vehicle including the airbag apparatus according to the embodiment has collided with another vehicle.

FIG. 5 is a diagram schematically illustrating a state after the vehicle including the airbag apparatus according to the first embodiment has collided with another vehicle.

When a pre-crash determination is established and when a collision with another vehicle V is predicted, the airbag 30 is deployed with the tethers 40 in a cut (disabled) state.

In this case, as illustrated in FIG. 5, the slit portions 34 are not formed, and the front surface 31 has a moderately curved, relatively level shape.

In this state, a volume of the airbag 30 becomes larger than that when the tethers 40 are enabled so that an impact absorption stroke of the airbag 30 in the case of the collision with the other vehicle V can be increased.

Since the front portion of the airbag 30 is undivided, shape stability upon the collision with the other vehicle V can be enhanced to stably sustain collision energy input by the other vehicle V.

As has been described heretofore, the first embodiment can produce the following effects.

1. During a collision with a human body of the pedestrian P, the bicyclist, or the like (hereinafter referred to as the pedestrian P or the like), the pedestrian P or the like collided with enters and is held in the slit portion 34 so that an impact can be absorbed by the airbag 30 while the pedestrian P or the like is stably restrained, and that the pedestrian P or the like can be pressed and accelerated forward of the vehicle so as to decrease relative acceleration of the pedestrian P or the like and the vehicle body, thereby preventing injury to the pedestrian P or the like.

Since the pedestrian P or the like is restrained while held in the slit portion 34, risk of secondary injury such as the pedestrian P or the like being sent flying forward of the vehicle can be reduced.

2. During a collision with an object other than a human body, such as the other vehicle V, the tethers 40 are cut to increase the volume of the airbag 30 so that an energy absorption capacity by contraction of the airbag 30 can be improved.

With the tethers 40 being disabled, the front portion of the airbag 30 is undivided so that shape stability of the airbag 30 can be enhanced to stably receive collision energy input by the object such as the other vehicle V.

3. The slit portions 34 are formed by the tethers 40 made of flexible base cloth panels, and the tethers 40 are cut by the tether cutters 113 during a collision with the other vehicle V, for example, so that the above-described effects can be effectively obtained with a simple configuration.

4. The slit portions 34 each extend vertically, and the plurality of slit portions 34 are formed in the front surface 31 of the airbag 30 while distributed in the vehicle width direction so that the pedestrian P or the like that has collided over a wide range in the vehicle width direction can be restrained.

Second Embodiment

Next, a description will be given on an airbag apparatus according to a second embodiment of the disclosure.

In each of the following embodiments, components in common with those in the preceding embodiment are denoted by identical reference numerals and signs and will not be repeatedly elaborated but differences will be mainly described.

Figure 6:
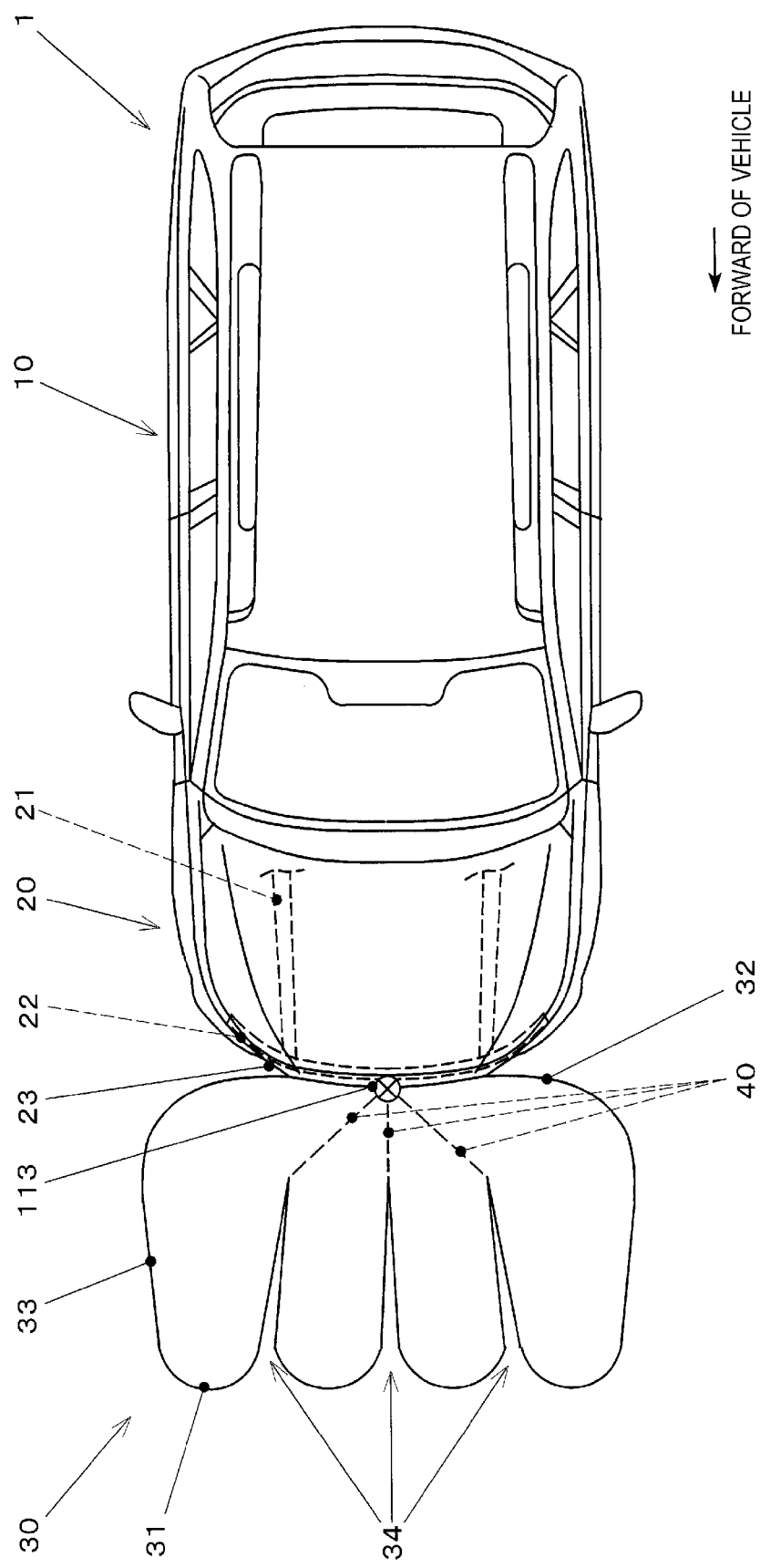
FIG. 6 is a diagram schematically illustrating a configuration of an airbag apparatus according to an embodiment of the disclosure.

FIG. 6 is a diagram schematically illustrating a configuration of the airbag apparatus according to the second embodiment.

FIG. 6 illustrates an enabled (uncut) state of the tethers 40.

In the second embodiment, rear ends of the tethers 40 are collected and disposed in a central portion in the vehicle width direction.

The common tether cutter 113 is disposed on the rear ends of the tethers 40.

The tether cutter 113 serves to collectively cut and disable the tethers 40.

According to the above-described second embodiment, the common tether cutter 113 is capable of cutting the plurality of tethers 40 so that substantially the same effects as the preceding first embodiment can be obtained, and that the apparatus configuration can be simplified.

Third Embodiment

Next, a description will be given on an airbag apparatus according to a third embodiment of the disclosure.

Figure 7:
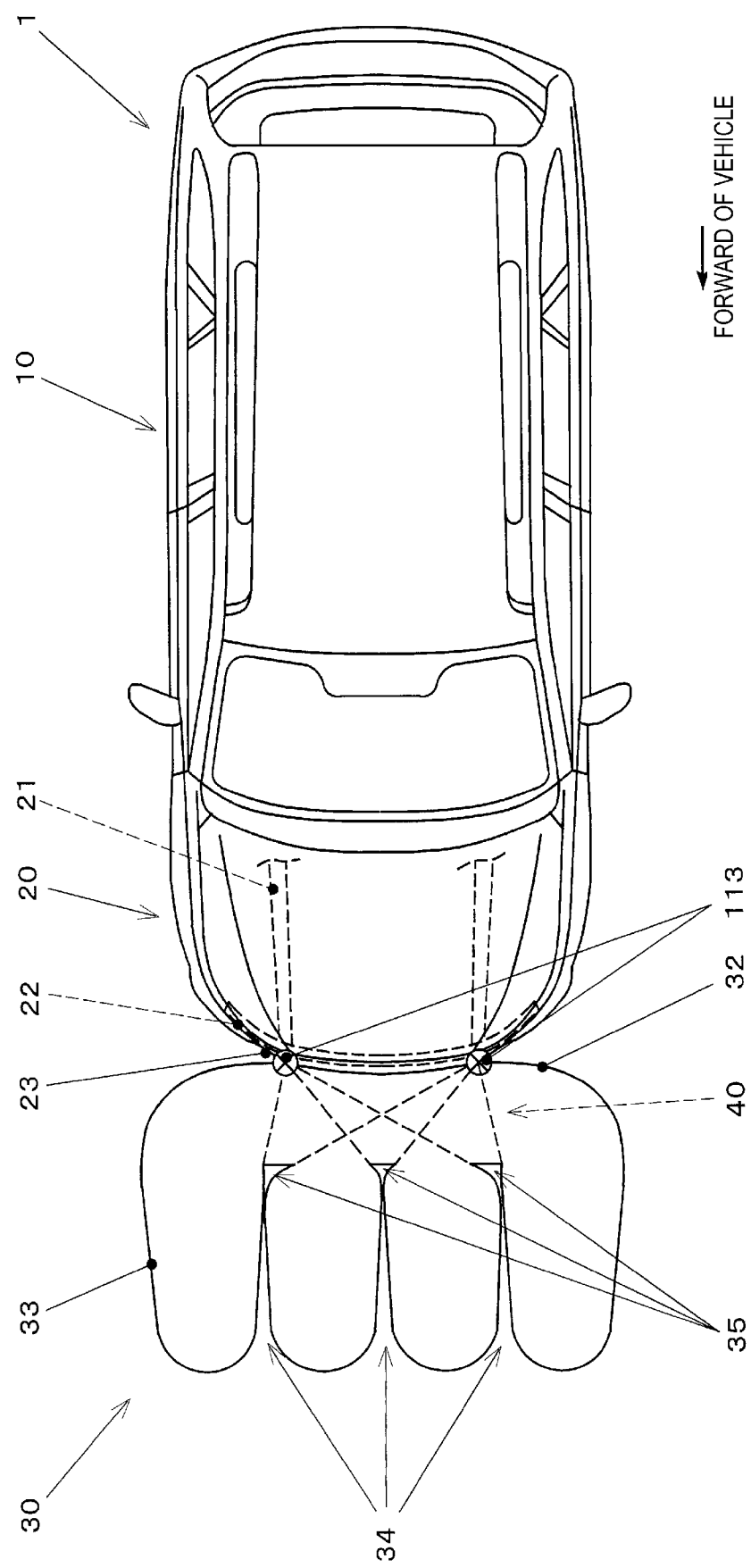
FIG. 7 is a diagram schematically illustrating a configuration of an airbag apparatus according to an embodiment of the disclosure.

FIG. 7 is a diagram schematically illustrating a configuration of the airbag apparatus according to the third embodiment.

FIG. 7 illustrates an enabled (uncut) state of the tethers 40.

In the third embodiment, each of the slit portions 34 is formed by the tethers 40 in a pair coupled to the rear surface 32 at two positions separate in the vehicle width direction.

In the third embodiment, a pair of the tether cutters 113 are disposed on left and right sides and spaced in the vehicle width direction, and the pair of tethers 40 that form each of the slit portions 34 are individually coupled to the left and right tether cutters 113.

At a rear end (groove bottom) of the slit portion 34, the pair of tethers 40 that pull the front surface 31 in different directions (directions to widen the slit portion 34) are spaced in the vehicle width direction and coupled to the front surface 31 of the airbag 30.

As a result, a space 35 is formed at the rear end of the slit portion 34 and has a width locally increased in the vehicle width direction.

According to the above-described third embodiment, substantially the same effects as the preceding first embodiment can be obtained, and also, the space 35 formed at the rear end of each of the slit portions 34 can enhance the capacity of restraining the pedestrian P or the like.

Modifications

The disclosure is not to be limited to the above-described embodiments but may be modified in various manners.

Such modifications will also fall within the technical scope of the disclosure.

1. The configurations of the airbag apparatus and the vehicle are not to be limited to those of the above-described embodiments but may be modified as suited.

For example, a configuration, shape, material, manufacturing method, location, and the number of each kind of components that constitute the airbag apparatus and the vehicle, and details of various kinds of control are not to be limited to those of the embodiments but may be modified as suited.

2. A method of performing a pre-crash determination and a method of discriminating a collision mode are not to be limited to those in the above-described embodiments but may be modified as suited.

3. In the embodiments, the number and location of the pulling members (tethers) and the number and location of the slit portions formed by the pulling members are simply provided for exemplifying purposes and may be modified as suited.

For example, in the embodiments, the tethers are distributed in a horizontal plane. However, the plurality of tethers may be distributed vertically. In this case, in accordance with a build of a pedestrian or the like, an upper tether and a lower tether may be controlled in different manners (e.g., one is kept enabled whereas the other is disabled).

The airbag apparatus according to the embodiments of the disclosure includes the airbag, the collision determiner, and the airbag deployment controller. The airbag is configured to be deployed forward of the vehicle body front of the vehicle. The collision determiner is configured to establish a human-body pre-crash determination when a collision probability with a human body is equal to or higher than a predetermined threshold. The airbag deployment controller is configured to deploy the airbag in response to the human-body pre-crash determination. The airbag includes the pulling member configured to pull and recess the front surface of the airbag rearward of the vehicle so as to form the slit portion configured to divide the front portion of the airbag.

With this configuration, for example, during a collision with a human body of a pedestrian, a bicyclist, or the like (pedestrian or the like), the pedestrian or the like collided with enters and is held in the slit portion so that an impact can be absorbed by the airbag while the pedestrian or the like is stably restrained, and that the pedestrian or the like can be pressed and accelerated forward of the vehicle so as to decrease relative acceleration of the pedestrian or the like and the vehicle body, thereby preventing injury to the pedestrian or the like.

Since the pedestrian or the like is retained while held in the slit portion, risk of secondary injury such as the pedestrian or the like being sent flying forward of the vehicle can be reduced.

In the embodiments of the disclosure, the collision determiner may be configured to establish an object pre-crash determination when a collision probability with an object other than a human body is equal to or higher than a predetermined threshold. The airbag deployment controller may be configured to deploy the airbag in response to the object pre-crash determination. The airbag apparatus may further include the pulling member disabling unit configured to disable the pulling member pulling the front surface in response to the object pre-crash determination.

With this configuration, for example, during a collision with an object other than a human body, such as another vehicle, the pulling member is disabled to increase the volume of the airbag so that an energy absorption capacity by contraction of the airbag can be improved.

With the pulling member being disabled, the front portion of the airbag is undivided so that shape stability of the airbag can be enhanced to stably sustain collision energy input by the object such as another vehicle.

In the embodiments of the disclosure, the pulling member may be a tether made of a flexible material, and the pulling member disabling unit may be a tether cutter configured to cut the tether.

Thus, the above-described effects can be effectively obtained with a simple configuration.

In the embodiments of the disclosure, the slit portion may extend vertically and may include a plurality of the slit portions formed in the front surface of the airbag and distributed in the vehicle width direction.

With this configuration, the human body that collides over a wide range in the vehicle width direction can be restrained.

It is noted that in the specification and claims, an expression of the slit portion extending vertically refers to vertically opposite ends of the slit portion having a level difference, and is not limited to the slit portion being formed exactly along a vertical direction but defined to include a state of being inclined, curved, and bent with respect to the vertical direction.

In the embodiments of the disclosure, the slit portion may have a space formed by pulling a rear end of the slit portion with a plurality of the pulling members in directions to widen the slit portion.

Thus, the space formed at the rear end of the slit portion can enhance restraint performance of the human body so as to promote the above-described effects.

As has been described heretofore, according to the embodiments of the disclosure, it is possible to provide the airbag apparatus that can prevent injury to a pedestrian or the like.

Moreover, according to the embodiments of the disclosure, it is possible to provide the airbag apparatus that can mitigate damage to the vehicle during a collision with an object.

The airbag control unit 110 and the environment recognition unit 120 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airbag control unit 110 and the environment recognition unit 120 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airbag control unit 110 and the environment recognition unit 120 illustrated in FIG. 2.

The invention claimed is:

1. An airbag apparatus to be applied to a vehicle, the airbag apparatus comprising:
   an airbag configured to be deployed forward of a vehicle body front of the vehicle;
   a collision determiner configured to establish an object pre-crash determination in a case where a first collision probability with an object is equal to or higher than a predetermined threshold; and
   an airbag deployment controller configured to deploy the airbag in response to the object pre-crash determination,
   wherein the airbag comprises a pulling member configured to pull and recess a front surface of the airbag rearward of the vehicle so as to form a slit portion configured to divide a front portion of the airbag.

2. The airbag apparatus according to claim 1,
   wherein the collision determiner is configured to establish an object pre-crash determination in a case where a second collision probability with a second object other than the object is equal to or higher than a second predetermined threshold, and
   wherein the airbag deployment controller is configured to deploy the airbag in response to the object pre-crash determination,
   the airbag apparatus further comprising a pulling member disabling unit configured to disable the pulling member pulling the front surface in response to the object pre-crash determination.

3. The airbag apparatus according to claim 2,
   wherein the pulling member comprises a tether made of a flexible material, and
   wherein the pulling member disabling unit comprises a tether cutter configured to cut the tether.

4. The airbag apparatus according to claim 1, wherein the slit portion extends vertically and comprises a plurality of slit portions formed in the front surface of the airbag, the plurality of slit portions being distributed in a vehicle width direction.

5. The airbag apparatus according to claim 2, wherein the slit portion extends vertically and comprises a plurality of slit portions formed in the front surface of the airbag, the plurality of slit portions being distributed in a vehicle width direction.

6. The airbag apparatus according to claim 3, wherein the slit portion extends vertically and comprises a plurality of slit portions formed in the front surface of the airbag, the plurality of slit portions being distributed in a vehicle width direction.

7. The airbag apparatus according to claim 1,
Wherein the pulling member comprises a plurality of pulling members, and
wherein the slit portion has a space formed by pulling a rear end of the slit portion with the plurality of the pulling members in directions to widen the slit portion.

8. The airbag apparatus according to claim 2,
Wherein the pulling member comprises a plurality of pulling members, and
wherein the slit portion has a space formed by pulling a rear end of the slit portion with the plurality of the pulling members in directions to widen the slit portion.

9. The airbag apparatus according to claim 3,
Wherein the pulling member comprises a plurality of pulling members, and
wherein the slit portion has a space formed by pulling a rear end of the slit portion with the plurality of the pulling members in directions to widen the slit portion.

10. The airbag apparatus according to claim 4,
Wherein the pulling member comprises a plurality of pulling members, and
wherein the slit portion has a space formed by pulling a rear end of the slit portion with the plurality of the pulling members in directions to widen the slit portion.

11. The airbag apparatus according to claim 5,
Wherein the pulling member comprises a plurality of pulling members, and
wherein the slit portion has a space formed by pulling a rear end of the slit portion with the plurality of the pulling members in directions to widen the slit portion.

12. The airbag apparatus according to claim 6,
Wherein the pulling member comprises a plurality of pulling members, and
wherein the slit portion has a space formed by pulling a rear end of the slit portion with the plurality of the pulling members in directions to widen the slit portion.

13. An airbag apparatus to be applied to a vehicle, the airbag apparatus comprising:
an airbag configured to be deployed forward of a vehicle body front of the vehicle; and
circuitry configured to
establish an object pre-crash determination in a case where a first collision probability with an object is equal to or higher than a predetermined threshold; and
deploy the airbag in response to the object pre-crash determination,
wherein the airbag comprises a pulling member configured to pull and recess a front surface of the airbag rearward of the vehicle so as to form a slit portion configured to divide a front portion of the airbag.

* * * * *